(12) United States Patent
Lindsay et al.

(10) Patent No.: US 6,433,874 B2
(45) Date of Patent: *Aug. 13, 2002

(54) ELECTRONIC SHEAROGRAPHY APPARATUS FOR PRODUCING ANIMATION OF SHEAROGRAM IMAGES

(75) Inventors: John S. Lindsay, Muscatine; Jason L. Gridley, Walcott, both of IA (US)

(73) Assignee: Bandag Licensing Corporation, Muscatine, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/835,598

(22) Filed: Apr. 16, 2001

Related U.S. Application Data

(63) Continuation of application No. 09/334,311, filed on Jun. 16, 1999, now Pat. No. 6,219,143.

(51) Int. Cl.⁷ .................................................. G01B 9/02
(52) U.S. Cl. ........................................ 356/458; 356/520
(58) Field of Search ............................ 356/35.5, 457, 356/458, 520

(56) References Cited

U.S. PATENT DOCUMENTS

| | | | |
|---|---|---|---|
| 4,702,594 A | 10/1987 | Grant | |
| 4,887,899 A | * 12/1989 | Hung | ......................... 356/35.5 |
| 5,011,280 A | 4/1991 | Hung | |
| 5,082,366 A | 1/1992 | Tyson et al. | |
| 5,091,776 A | * 2/1992 | Tyson, II | ......................... 356/35.5 |
| 5,094,528 A | * 3/1992 | Tyson et al. | ................ 356/35.5 |
| 5,175,601 A | 12/1992 | Fitts | |
| 5,257,088 A | 10/1993 | Tyson et al. | |
| 5,257,089 A | 10/1993 | Stetson | |
| 5,307,139 A | 4/1994 | Tyson et al. | |
| 5,319,445 A | 6/1994 | Fitts | |
| 5,341,204 A | 8/1994 | Grant et al. | |
| 5,414,512 A | 5/1995 | Grant et al. | |
| 5,786,533 A | 7/1998 | Newman | |
| 5,948,976 A | 9/1999 | Newman | |
| 6,088,101 A | 7/2000 | Newman | |
| 6,089,085 A | 7/2000 | Newman | |
| 6,092,414 A | 7/2000 | Newman | |
| 6,219,143 B1 | * 4/2001 | Lindsay et al. | ............. 356/520 |

FOREIGN PATENT DOCUMENTS

EP 1043578 A2 10/2000

OTHER PUBLICATIONS

Steinbichler, HTCIplus non–destructive tire test system, Jul. 1998.*

Papers from Steinbichler website http://www.steinbichler.com/tire.htm last updated Jul. 1997.*

Steinbichler, HTCIplus non–destructive tire test system. Papers from Steinbichler website http://www.steinbichler.com/Tire.htm as of Aug. 17, 1998.

* cited by examiner

Primary Examiner—Samuel A. Turner
(74) Attorney, Agent, or Firm—Leydig, Voit & Mayer, Ltd.

(57) ABSTRACT

The invention relates to an apparatus for performing electronic shearography on a test object, especially a tire or retread tire. The apparatus uses a laser light source to illuminate the test object. An optical element through which electromagnetic radiation is reflected from the test object is transmitted and forms a random interference image. The random interference image is electronically processed to provide a video animation of the effects of stress on the test object.

11 Claims, 4 Drawing Sheets

ELECTRONIC SHEAROGRAPHY APPARATUS FOR PRODUCING ANIMATION OF SHEAROGRAM IMAGES

CROSS-REFERENCE TO RELATED PATENT APPLICATION

This patent application is a continuation of U.S. patent application Ser. No. 09/334,311 filed Jun. 16, 1999 now U.S. Pat. No. 6,219,143, the disclosure of which is hereby incorporated by reference.

FIELD OF THE INVENTION

The present invention relates generally to the field of nondestructive testing. Specifically, the present invention relates to the technique of electronic shearography. More specifically, the present invention relates to the use of electronic shearography to detect defects in vehicle tires by animating shearograms produced while the tires undergo a varying stress continuum.

BACKGROUND OF THE INVENTION

The technique of shearing interferometry, or shearography involves the interference of two laterally displaced images of the same object to form an interference image. Conventional shearographic methods require that a first interference image (or baseline image) be taken while the object is in an unstressed or first stressed condition, and another interference image be taken while the object is in a second stressed condition. Comparison of these two interference images (preferably by methods of image subtraction) reveals information about the strain concentrations and hence the integrity of the object in a single image called a shearogram. In particular, shearography has been shown to be useful to detect strain concentrations and hence defects in vehicle tires, especially retread vehicle tires.

In conventional electronic shearography, interference images are stored in a computer memory and are compared electronically to produce single static shearograms. Because all the data are processed electronically, the results of the analysis can be viewed in "real time". "Real time", as used in the prior art, refers to the ability to view the shearogram nearly instantaneously after the second interference image has been taken.

An apparatus and method for performing electronic shearography is described in U.S. Pat. No. 4,887,899 issued to Hung. The apparatus described in the cited patent produces an interference image by passing light, reflected from the test object, through a birefringent material and a polarizer. The birefringent material, which can be a calcite crystal splits a light ray, reflected from the object, into two rays, and the polarizer makes it possible for light rays reflected from a pair of points to interfere with each other. Thus, each point on the object generates two rays, and the result is an interference image formed by the optical interference of two laterally displaced images of the same object.

Prior to the developments disclosed in the Hung patent, the spatial frequency of the interference image produced in shearographic analysis was relatively high requiring the use of high resolution photographic film to record a useful interference image. The development disclosed in the Hung patent produces an interference image with a relatively low spatial frequency because the effective angles between the interfering rays are small. Therefore, the interference images can be recorded by a video camera, a video camera normally having much less resolving capability than a high density or high resolution photographic film. By storing an interference image of the object in its initial, unstressed condition, and by comparing that interference image, virtually instantaneously, by computer with another interference image taken under a different level of stress, a "real time" image or shearogram of the resultant strains on the object can be observed. Each point on the actual interference image is generated by the interference of light emanating from a pair of distinct points on the object. Therefore, each pixel of the video camera is illuminated by light reflected from those two points. If the overall illumination remains constant, then any variations in the pixel intensity, in the interference image, will be due only to changes in the phase relationship of the two points of light.

When the initial video image of the interference image is stored, an initial intensity for each pixel is recorded, as described above. If differential deformations occur in the object, such deformations will cause changes in the subsequent interference image. In particular, the intensity of a given pixel will change according to change in the phase relationship between the two rays of light, reflected from the two points on the object, which illuminate the pixel. The phase differences can be either positive changes, causing the pixel to become brighter or negative changes, causing the pixel to become darker. Whether the pixel becomes brighter or darker depends on the initial phase relationship and the direction of the change of phase. Due to the cyclic nature of phase interferences, as the deformation of the object continually increases, the intensity at a given pixel may pass through a complete cycle. That is, the intensity of the pixel might increase to a maximum (positive) difference, then return to the original intensity, and then continue to a maximum (negative) difference, and so on.

In systems of the prior art, a single shearogram is derived from two single static interference images taken at two distinct stress levels. The single shearogram is then viewed by an operator for analysis if multiple shearograms are taken, the analysis is done one shearogram at a time. Thus, the operator attendance time, required to perform a thorough stress analysis, is substantial. Further, a single shearogram may falsely show light features that appear to be defects (referred to as "false positives"). These "false positives" are caused by different reflective characteristics on the surface of the test object and appear as defects when a static shearogram is viewed. Further still, in a static shearogram some real defects may be "washed out" and thus not visible (referred to as "false negatives"), at certain (particularly high) stress levels. These "washed out" effects are caused by shearographic fringe lines that are not spatially separated enough to be visibly distinguishable and therefore appear to be aberrational light effects rather than real defects in the test object. Thus, a single static shearogram may contain inaccurate information with regards to the defects actually present. Furthermore, an operator having to analyze a large number of shearograms requires a large amount of operator attendance time.

There is a need and desire for an improved method of presentation of shearographic images that provide advantages over the prior art. There is also a need and desire for a method of presenting shearographic images that provide improved accuracy, shorter attendance times by an operator, and shorter overall cycle times for a test object. Further, there is a need and desire for a method of presenting shearographic images that reduce the undesirable effects of false negatives by preventing "wash out" of larger defects at high stress levels. Further still, there is a need and desire for a method of presenting shearographic images that allows real defects to be distinguished over light features that otherwise may be confused as defects, thereby minimizing false positives.

SUMMARY OF THE INVENTION

The present invention relates to an apparatus for performing electronic shearography on a test object. The apparatus includes a source of coherent electromagnetic radiation for illuminating the test object, and an optical element through which electromagnetic radiation reflected from the test object is transmitted forming an interference image. A detector converts the interference image into an electrical signal representative of the interference image. An animation device is coupled to the detector. The animation device receives the electrical signal representative of the interference image. The animation device retains image information derived from the electrical signals representative of the interference image at a predetermined frame rate. The animation device compares the retained interference image information with a baseline interference image to produce a shearogram image, and the animation device is adapted to play a series of sequential shearogram images. A display device is coupled to the animation device, providing visualization of the sequential shearogram images.

The present invention further relates to a method of analyzing a test object. The method includes directing coherent electromagnetic radiation onto a test object, providing electromagnetic radiation reflected from the test object to an optical shearing device, the optical shearing device creating an interference image, and directing the interference image, emerging from the shearing device, onto a detector. The method further includes capturing an electrical signal, communicated from the detector, in a capture device, the electrical signal being representative of the interference image, storing interference image information in a memory device communicated from the capture device and comparing interference image information stored in the memory device, to a stored interference image to produce a shearogram image. The method still further includes repeating the aforementioned steps at varying stress levels and displaying shearogram image information at a frame rate.

The present invention still further relates to an apparatus for performing electronic shearography on a tire undergoing varying states of stress. The apparatus includes a source of coherent electromagnetic radiation for illuminating the tire, a birefringent material through which electromagnetic radiation reflected from the tire is transmitted, and a polarizer through which electromagnetic radiation, emerging from the birefringent material, is transmitted, the birefringent material and the polarizer cooperating to form an interference image. The apparatus also includes a video camera, the video camera converting the interference image to an electrical signal and a video capture circuit coupled to the video camera, the capture circuit receiving the electrical signal from the camera, the electrical signal being representative of the interference image, the capture circuit retaining image information derived from the electrical signals representative of the interference image at a frame rate. Further, the apparatus includes a computer coupled to the capture circuit, the computer adapted to compare sequential interference images retained by the capture circuit to a baseline image to produce a shearogram image, the computer adapted to play the sequential shearogram images, and the computer including a display device coupled to the computer providing visualization of the sequential shearogram images and a memory device, coupled to the computer, the memory device being adapted to store the interference image information retained by the capture circuit.

BRIEF DESCRIPTION OF THE DRAWINGS

The invention will hereafter be described with reference to the accompanying drawings, wherein like reference numerals denote like elements in the various drawings, and.

DETAILED DESCRIPTION OF THE PREFERRED EMBODIMENTS

The present invention utilizes basic concepts of electronic shearography. More details of electronic shearography are given in U.S. Pat. No. 4,887,899, the disclosure of which is incorporated by reference herein.

Figure 1:
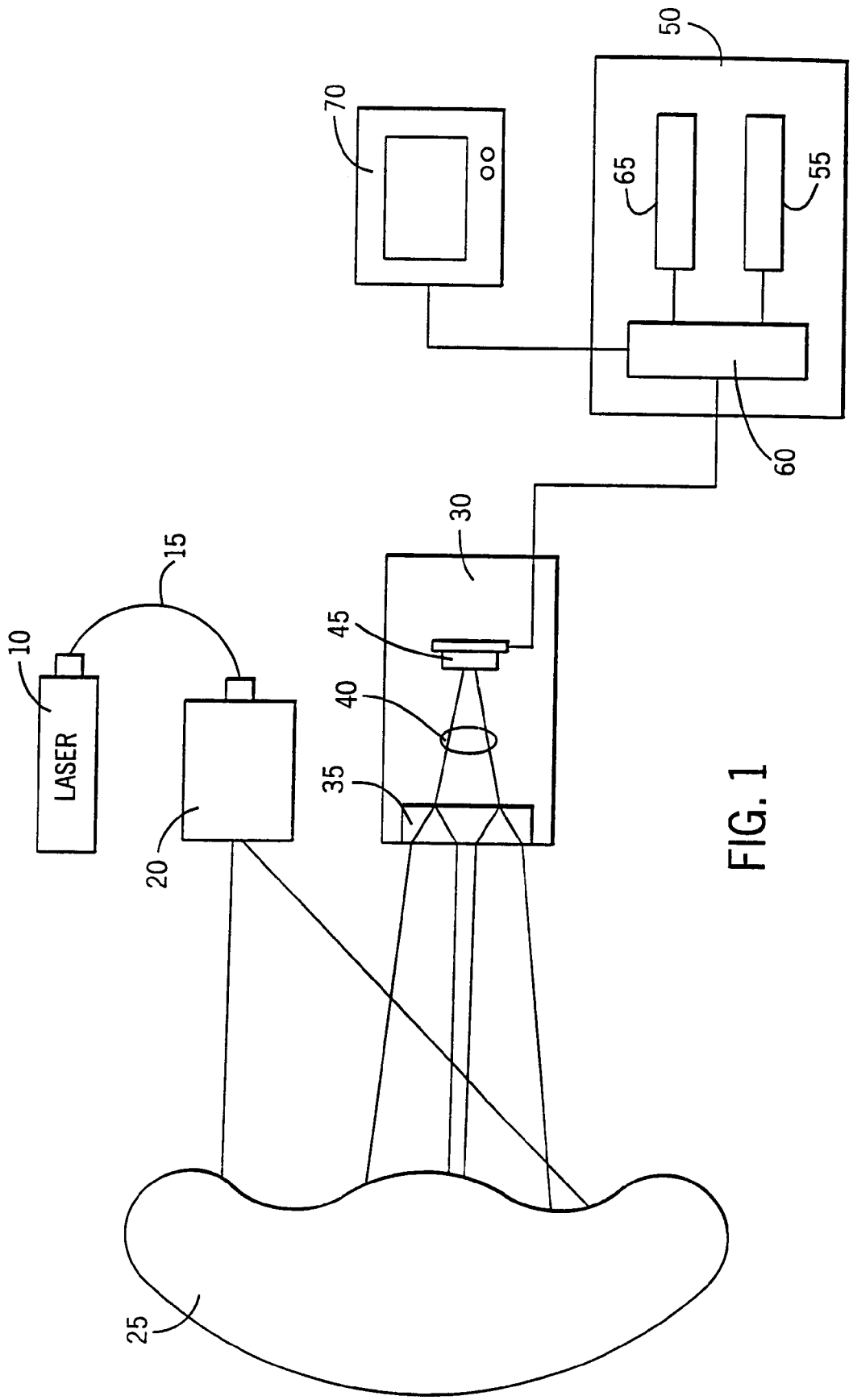
FIG. 1 is a schematic block diagram of a shearographic imaging system.

Referring now to FIG. 1, a schematic block diagram of an arrangement for practicing electronic shearography is depicted. Coherent electromagnetic radiation or coherent light is produced by a laser 10, the laser light being directed through a fiberoptic cable 15 (or alternatively directed by a mirror or a set of mirrors or provided directly) to a beam expander or illuminator 20. Beam expander 20 directs the coherent light onto a test object 25. The surface of test object 25 is illuminated and reflects light into a shearography camera 30. Shearography camera 30 includes an optical element 35, a lens 40 for focusing the light, and a detector 45. Optical element 35 may be a birefringent material and a polarizer, the birefringent material being a calcite material such as a Wallestein prism. The optical element is however not limited to a birefringent material and a polarizer, other elements such as a defraction grating, a Mickelson mirror, or an appropriate wave plate may be applied. Further, optical element 35 may contain other optics, such as, but not limited to a quarter-wave plate. Detector 45 may be a traditional video camera, a digital video camera, a charge coupled device (CCD), or other photo sensitive detection equipment.

The output of detector 45 is coupled to an animation device such as a computer 50. Computer 50 includes a video capture circuit 55, a central processing unit 60, and a memory 65. Alternatively, computer 50 may include a logical extractor that is configured to extract shearographic images from memory in a predetermined manner. The logical extractor may be embodied in hardware or alternatively in software within computer 50. Video capture circuit 55 may be a dedicated video card or a frame grabber preferably capable of capturing entire video images at a rate of at least 15 frames per second. However, video capture circuit 55 may be capable of capturing video images at any suitable rate. Central processing unit 60 may be any of a number of conventional microprocessors or a dedicated microprocessor device. Detector 45 is coupled to central processing unit 60, central processing unit 60 being coupled to video capture circuit 55 and memory device 65. Central processing unit 60 is further coupled to a display unit 70, which may be a CRT (cathode ray tube) display, an LCD (liquid crystal display), or the like.

In operation, coherent light emanating from beam expander 20 is reflected from test object 25. Optical element 35 collects the reflected light from object 25 causing an interference image to be created. The interference image is focused on detector 45 through lens 40. Conventionally, a first interference image is taken while test object 25 is in a first stressed condition, and a second interference image is taken with object 25 in a second stressed condition. The two interference images are then compared by a process of subtracting one image from the other and the shearogram is created and displayed on a monitor.

In the present invention, test object 25 undergoes a sequence of or continuum of varying stress levels. Detector 45 continuously captures the interference image from optical element 35 and communicates the interference image to computer 50, during the stress cycle. Capture circuit 55 electronically captures entire interference images at a rate of at least 15 frames per second. Capture circuit 55 communicates the interference images to central processing unit 60. Central processing unit 60 compares the interference image to a baseline interference image of the object in the unstressed or near unstressed state (or alternatively any chosen stress state), by a process of subtracting one interference image from the baseline interference image, thereby forming a shearogram. Each shearogram image is simultaneously displayed on display unit 70 and stored in memory device 65. After the series of varying stress levels has been completed, microprocessor 60 (or alternatively a logical extractor) recalls the sequence of shearogram images captured by capture circuit 55 and replays them in sequence on display unit 70. The sequential display of these shearogram images, at a rate of at least 15 frames per second, produces a shearographic animation of the shearograms produced during or after stressing of test object 25.

Figure 2:
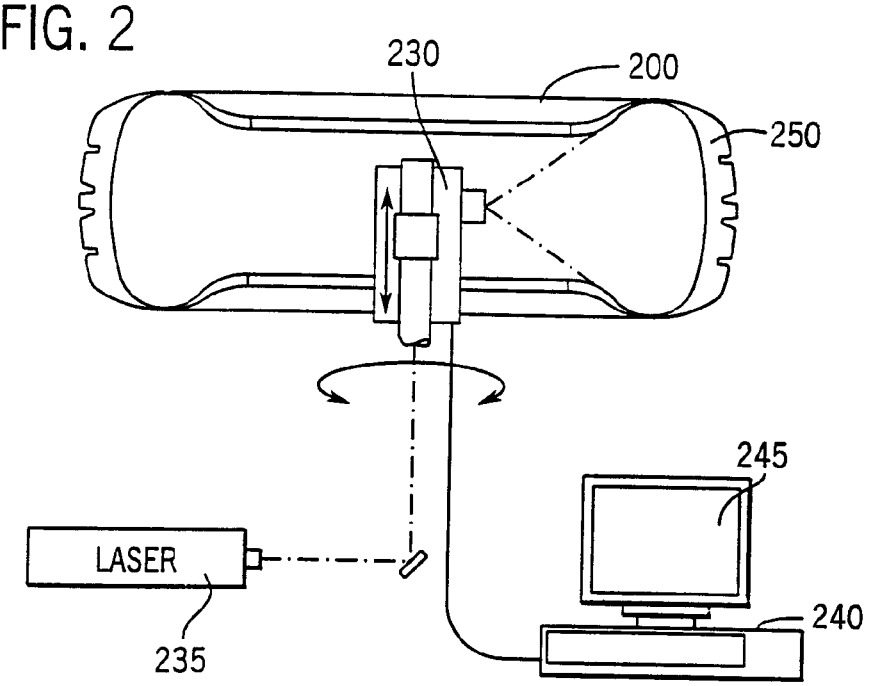
FIG. 2 is a schematic diagram of a shearographic imaging system showing a cross-section of a tire as the test object.

Test object 25 may be a relatively large object, such as a tire 200, as depicted in FIG. 2. A shearographic camera 230 that is rotatable within the inside of the bead 202 of tire 200 is depicted in FIG. 2. (Alternatively, tire 200 may be rotated and camera 230 may be stationary.) Shearographic camera 230 includes a laser 235 producing a coherent beam of light to illuminate the inside of tire 200. Shearographic camera 235 is further coupled to a computer 240 having a display 245, computer 240 and display 245 being used for data acquisition and animation of the resultant shearographic images.

Figure 3:
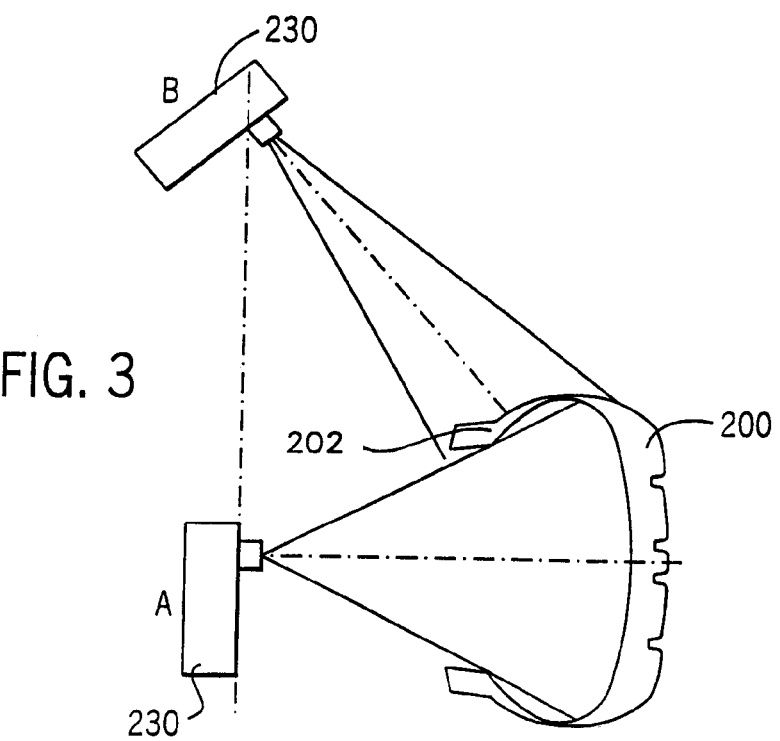
FIG. 3 is a schematic diagram of a shearographic camera at two different orientations relative to the tire.

When used for detection of defects in tires or retread tires, shearographic imaging camera 230 may be positioned inside the tire depicted as position A in FIG. 3 or outside the tire as depicted in FIG. 3 by position B. Having shearographic camera 230 in position A allows for detection of defects in the tread area of tire 200. Having shearographic camera 230 in position B provides for examination of the bead area and side wall area of tire 200.

Figure 4:
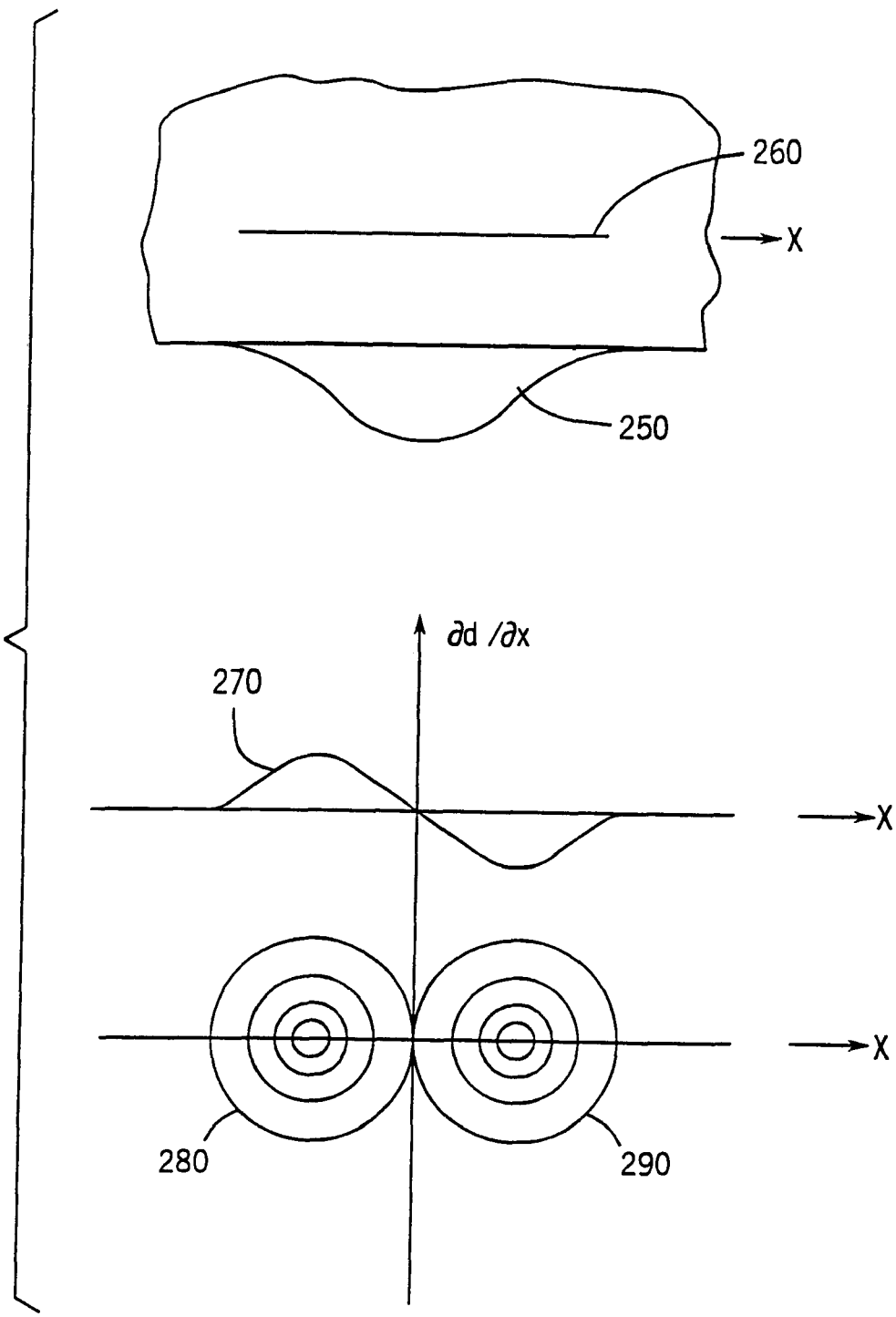
FIGS. 4 and 5 are a graphical representation of the deformation of a test object, showing the corresponding shearographic fringe pattern produced.

Referring back to FIG. 2, in operation, shearographic camera 230 and tire 200 may be placed into a vacuum chamber capable of subjecting tire 200 to a vacuum producing stresses on tire 200 by producing a positive pressure (relative to the pressure inside the vacuum chamber) in voids within tire 200 causing a bulge 250. Referring to FIG. 4, the bulge may be caused by a defect 260, defect 260 possibly being but not limited to a delamination between two layers of the tire or a void in the molded material. When subjected to a vacuum, bulge 250 appears because of positive pressure within the void space of bond 260. The graph of FIG. 4 depicts the slope of bulge 250 by line 270. The graph of FIG. 4 further depicts a fringe pattern, including groups of rings 280 and 290, produced by the differencing of two optical interference images produced by shearographic camera 230. Fringe patterns 280 and 290 of a shearogram image is produced by computer 240 (by the method of differencing or by any other image resolving technique) appear as a set of roughly concentric, substantially circular fringe lines corresponding to slope 270 of bulge 250. Fringe patterns 280 and 290 are a contour mapping of the absolute value of slope 270 of bulge 250. Therefore, because bulge 250 is substantially symmetric, fringe patterns 280 and 290 appear to be mirror images of each other.

Referring back to FIG. 2, in operation, shearographic camera 230 takes a series of interference images that are communicated to computer 240 while tire 200 undergoes varying vacuum or stress cycle. In a preferred embodiment tire 200 undergoes a depressurization cycle and then a pressurization cycle to return the tire to an unstressed state. Because the field of view of shearographic camera 230 is limited by the field of view of the optical elements and by the size of the tire, a tire must be sectioned into a number of sectors ranging from four to twelve, or more. In an exemplary embodiment, tire 200 is sectioned into nine different sectors. Shearographic camera 230 therefore views an area corresponding to 40° of arc of tire 200. After the depressurization and pressurization cycle, camera 230 is rotated to the next sector, there the depressurization and pressurization cycle is repeated. Computer 240 continues to collect data and may, in a preferred embodiment, simultaneously display data on display 245 throughout the entirety of the nine sector cycle. The shearograms are generated and displayed at a rate such that they appear to be animated.

Figure 5:
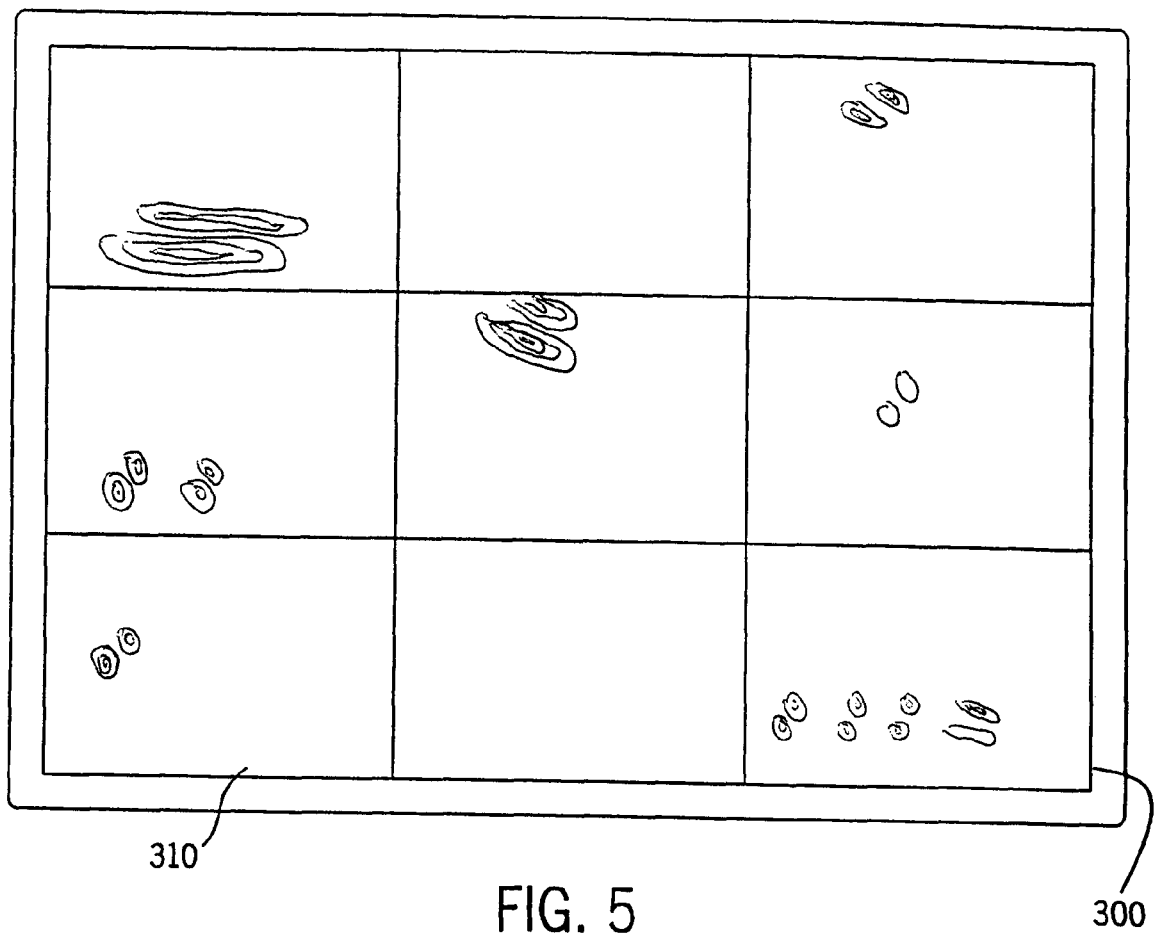

Referring now to FIG. 5, a display 300 is depicted, the display being divided into nine different sectors, each sector 310 corresponding to an approximate 40° arc of the inside of a tire. Alternatively, however, each sector 310 could correspond to any specific field of view, of a tire, for a shearographic camera, such as shearographic camera 230. Computer 240 as depicted in FIG. 2, which may be connected to display 300, is capable of displaying a plurality of animations simultaneously as depicted in FIG. 5. FIG. 5 depicts a static screen shot of a typical display, however, display 300 actually shows animations or sequential imaging of shearogram images produced by computer 240 at a rate providing an animated effect and in a preferred embodiment at a rate of 30 frames per second. A display having multiple animation windows or screen sectors provides the clear advantage that an operator may observe the animations simultaneously looking for the appearance of indications of deformations due to defects. This simultaneous observation permits less attendance time by an operator, therefore providing substantial time savings without substantial loss of accuracy. Capturing and providing animation preferably at 30 frames per second (or alternatively any suitable animation rate) provides animations that are sufficiently smooth to be useful to an operator.

The advantages of animating the sequence of images is that animation improves accuracy in the detection of defects. Light effects that would appear as "false positives" in a static shearogram are not manifested as defects when animated, due to the absence of apparent motion induced by the animation. A fringe pattern caused by a real defect will tend to "grow" or "shrink" and the intensity of fringe lines will appear to cycle during the animation, due to the continually changing stress state on the test object. Furthermore, real defects that may be "washed out" in a static shearogram or even in an integration of multiple shearographic images, become apparent with animation of the shearographic images.

Animation of the shearographic images allows visualization of defects at a multiplicity of stress states, some of the stress states may not cause the "washed out" effect and further the apparent motion created by animation of the images manifests a real defect as opposed to the light effect. Animation of the shearograms goes through a substantial continuity of stress states, therefore defects that may not be present at two chosen stress states become apparent in the animation. These advantages in animation of the shearographic images provide better accuracy in detecting defects and provides for shorter analysis times by an operator.

It has been recognized that a number of signal processing techniques, such as, but not limited to the use of fuzzy logic, neural networks, artificial intelligence, and pattern recognition techniques, may be applied to perform automatic defect identification. However, systems such as this tend to be inherently complex and substantially costly. Therefore, retaining a human operator, but cutting down on the operators' required attendance time by providing the operator with numerous simultaneous animations, has the effect of providing substantial cost savings.

Although animation of shearographic images may be preferable at a rate of at least 15 frames per second, it should be noted that frame rates of less than 15 frames per second may also be used effectively, however the animation may appear discretized as compared to an animation running at least 15 frames per second. Further, it should be appreciated that frame rates of more than 30 frames per second may be advantageous in specific applications and may become simpler to implement as microprocessor and video capture technology is improved.

It should be appreciated that although a differencing approach to producing each shearogram is described above, the methods and apparatuses disclosed may be applied to different image resolving techniques, including but not limited to continuous integration. Continuous integration describes the process of taking a first interference image and subtracting a second interference image to produce a first shearogram. A third interference image is taken and subtracted from the first shearogram to produce a second shearogram. A fourth interference image is then taken and subtracted from the second shearogram to produce a third shearogram. This sequence is continued throughout the testing cycle. The continuous integration technique and other techniques known to those of ordinary skill in the art, lend themselves to the animation techniques disclosed above and can be applied thereto without departing from the spirit and scope of the present invention.

The process and apparatus described above should be appreciated to optimize a number of competing factors associated with shearographic imaging, especially as applied to the testing for defects in retread tires (although clearly not limited to this application). These competing factors include, but are not limited to, maximizing data, maximizing accuracy, minimizing operator attendance time, available light wavelengths, object size, equipment costs, and optical field of view. By animating shearograms in a plurality of sectors on a display screen, a number of these competing factors are optimized.

It is understood that, while the detailed drawings and examples given describe preferred exemplary embodiments of the present, they are for purposes of illustration only. The method and apparatus of the invention is not limited to the precise details and conditions disclosed. For example, the invention is not limited to the specific frame rates at which shearographic images are captured or displayed. Further, the number of sectors of the test object is completely variable and, the object being tested may be any of a number of test objects. Still further, the method by which the test object is placed under stress may be any of a number of techniques. Still further, other optical systems that produce interference images, other than shearographic camera 30, may be applied to produce shearograms. Various changes may be made to the details disclosed without departing from the spirit of the invention, which is defined by the following claims.

What is claimed is:

1. An apparatus for performing electronic shearography on a test object comprising:

a shearography camera for taking an interference image of the test object, an image processor coupled to the shearography camera for receiving a plurality of sequential interference images from the shearography camera, producing a plurality of sequential shearogram images of the test object from the interference images and animating the sequential shearogram images to represent dynamically changing stress states on the test object, and a display coupled to the image processor for providing visualization of the animation of the sequential shearogram images.

2. The apparatus according to claim 1 wherein the image processor further includes a memory device for storing the shearogram images.

3. The apparatus according to claim 2 wherein the image processor animates the shearogram images stored in the memory device.

4. The apparatus according to claim 1 wherein image processor receives interference images from the shearography camera at a frame rate of at least fifteen frames per second.

5. The apparatus according to claim 1 wherein the image processor animates the shearogram images at an animation rate of at least fifteen frames per second.

6. The apparatus according to claim 1 wherein the image processor substantially simultaneously animates multiple shearogram image sequences representative of different sections of the test object.

7. The apparatus according to claim 1 wherein the image processor is a computer.

8. A method for analyzing a test object comprising:

(a) taking an interference image of a test object, (b) comparing the interference image with a baseline interference image to produce a shearogram image, (c) repeating steps (a) and (b) at varying stress levels to produce a plurality of shearogram images, and (d) displaying the plurality of shearogram images at a frame rate fast enough to generate an animation representative of dynamically changing stress states on the test object.

9. The method according to claim 8 further including the step of storing the shearogram images.

10. The method according to claim 8 wherein the frame rate is at least fifteen frames per second.

11. The method according to claim 8 further comprising simultaneously displaying multiple shearogram image sequences representative of different sections of the test object.

* * * * *